(12) United States Patent
Hsu et al.

(10) Patent No.: US 7,920,269 B2
(45) Date of Patent: Apr. 5, 2011

(54) SYSTEM AND METHOD FOR MEASURING INTERFERENCES

(75) Inventors: I-Jen Hsu, Tao-Yuan (TW);
Cheng-Chung Lai, Tao-Yuan (TW)

(73) Assignee: Chung Yuan Christian University, Tao-Yuan (TW)

( * ) Notice: Subject to any disclaimer, the term of this patent is extended or adjusted under 35 U.S.C. 154(b) by 616 days.

(21) Appl. No.: 11/833,440

(22) Filed: Aug. 3, 2007

(65) Prior Publication Data

US 2009/0033916 A1    Feb. 5, 2009

(51) Int. Cl.
*G01B 9/02* (2006.01)
*G01B 11/02* (2006.01)

(52) U.S. Cl. .......................... 356/450; 356/496; 356/511
(58) Field of Classification Search .................. 356/479, 356/484, 497, 511, 450, 496
See application file for complete search history.

(56) References Cited

U.S. PATENT DOCUMENTS

| | | | |
|---|---|---|---|
| 5,166,751 A * | 11/1992 | Massig | 356/495 |
| 5,301,010 A * | 4/1994 | Jones et al. | 356/479 |
| 6,847,456 B2 * | 1/2005 | Yang et al. | 356/489 |
| 7,557,929 B2 * | 7/2009 | Fang-Yen et al. | 356/484 |
| 2005/0057756 A1 * | 3/2005 | Fang-Yen et al. | 356/497 |
| 2005/0105097 A1 * | 5/2005 | Fang-Yen et al. | 356/497 |

FOREIGN PATENT DOCUMENTS

TW        182628      10/2001

* cited by examiner

*Primary Examiner* — Patrick J Connolly
(74) *Attorney, Agent, or Firm* — WPAT, PC; Justin King

(57) ABSTRACT

A system and method for measuring interferences are disclosed. The system is based on the concept of a composite interferometer. The sample is measured while a simultaneous compensation of the phase deviation due to the relative displacement of the optical delay component between the measurements at different pixels of the sample is performed. In the application of profilometry, the information of the surface profile of a material is obtained from the phase shift of the interference signal. By using the proposed compensation mechanism, an axial resolution at nanometer scale can be achieved. For the measurement of a thin film, a polarized probe beam is oblique incident on the sample. The system can perform a simultaneous measurement of the refractive index and the thickness of the thin film. From the ratio of the intensities of the interferograms of TE and TM waves as well as the phase shifts of the interferograms, the refractive index and the thickness of the thin film can then be obtained simultaneously.

26 Claims, 7 Drawing Sheets

SYSTEM AND METHOD FOR MEASURING INTERFERENCES

BACKGROUND OF THE INVENTION

1. Field of the Invention

The present invention generally relates to system and method for measuring interferences.

2. Description of the Prior Art

SEM (Scanning electron microscope) is expensive to buy and maintain. It is dynamic rather than static in its operation: requiring extremely stable high-voltage supplies, extremely stable currents to each electromagnetic coil/lens, continuously-pumped high-/ultra-high-vacuum systems, and a cooling water supply circulation through the lenses and pumps. As it is very sensitive to vibration and external magnetic fields, microscopes aimed at achieving high resolutions must be housed in buildings (sometimes underground) with special services.

However, the AFM (Atomic Force Microscope) has several advantages over the scanning electron microscope (SEM). Unlike the electron microscope which provides a two-dimensional projection or a two-dimensional image of a sample, the AFM provides a true three-dimensional surface profile. Additionally, samples viewed by AFM do not require any special treatments (such as metal/carbon coatings) that would irreversibly change or damage the sample. While an electron microscope needs an expensive vacuum environment for proper operation, most AFM modes can work perfectly well in ambient air or even a liquid environment. This makes it possible to study biological macromolecules and even living organisms. In principle, AFM can provide higher resolution than SEM.

Nevertheless, a disadvantage of AFM compared with the scanning electron microscope (SEM) is the image size. The SEM can image an area on the order of millimeters by millimeters with a depth of field on the order of millimeters. The AFM can only image a maximum height on the order of micrometers and a maximum scanning area of around 150 by 150 micrometers. Another inconvenience is that at high resolution, the quality of an image is limited by the radius of curvature of the probe tip, and an incorrect choice of tip for the required resolution can lead to image artifacts. Traditionally the AFM could not scan images as fast as an SEM, requiring several minutes for a typical scan, while an SEM is capable of scanning at near real-time (although at relatively low quality) after the chamber is evacuated. The relatively slow rate of scanning during AFM imaging often leads to thermal drift in the image (Lapshin, 2004, 2007), making the AFM microscope less suited for measuring accurate distances between artifacts on the image.

Hence, a system and method for measuring interferences of the present invention is disclosed for solving the above-mentioned problems.

SUMMARY OF THE INVENTION

Therefore, in accordance with the previous summary, objects, features and advantages of the present disclosure will become apparent to one skilled in the art from the subsequent description and the appended claims taken in conjunction with the accompanying drawings.

A system for measuring interferences is disclosed, wherein the system comprises a first source, an optical delay line device, a first detect device, a second detect device, and an optical path module. The optical path module comprises a plurality of paths for beams generating from the first source to pass through, wherein the plurality of paths comprise a first path, a second path, a third path, a fourth path, a fifth path and a sixth path. The first path leads from the first source to a sample; the second path leads from the sample to the first detect device; the third path leads from the first source to the optical delay line device; the fourth path leads from the optical delay line device to the first detect device; the fifth path leads from the optical delay line device to the second detect device; and the sixth path leads from the first source to the second detect device.

In addition, the length of the fourth path is changed by the optical phase modulation so as to shift the phase of a first interference signal between the beam passing through the second path and the beam passing through the fourth path, and the first detect device receives and detects the phase shift of the first interference signal. The length of the fifth path is changed by the optical phase modulation so as to shift the phase of a second interference signal between the beam passing through the fifth path and the beam passing through the sixth path, and the second detect device receives and detects the phase shift of the second interference signal.

The present invention further discloses a method for measuring interferences, wherein the method comprises the following steps: generating the first beam by the first source; setting the first path by the optical path module, wherein the first beam is projected from the first source to the sample via the first path; setting the second path by the optical path module, wherein the first beam is reflected from the sample to the first detect device via the second path; setting the third path by the optical path module, wherein the first beam is projected from the first source to the optical delay line device via the third path; and setting the fourth path by the optical path module, wherein the first beam is reflected from the optical delay line device to the first detect device via the fourth path.

The length of the fourth path is changed by a optical phase modulation generated by the optical delay line device so as to shift the phase of a first interference signal between the first beam passing through the second path and the first beam passing through the fourth path, and the first detect device receives and detects the phase shift of the first interference signal.

BRIEF DESCRIPTION OF THE DRAWINGS

The accompanying drawings incorporated in and forming a part of the specification illustrate several aspects of the present invention, and together with the description serve to explain the principles of the disclosure. In the drawings.

DETAILED DESCRIPTION OF THE PREFERRED EMBODIMENTS

Figure 1:
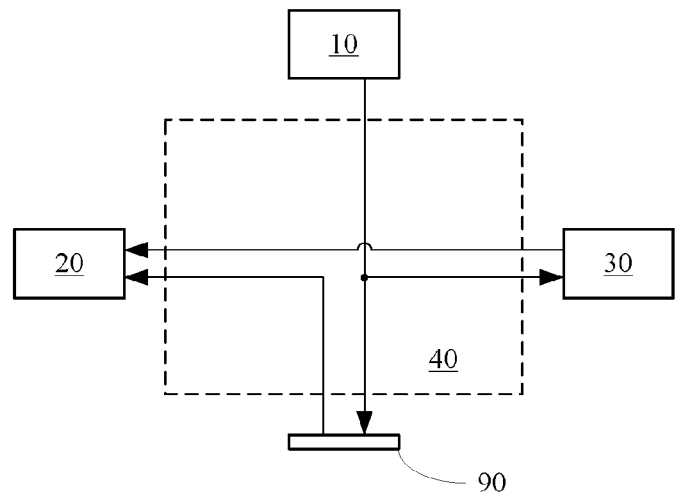
FIG. 1, FIG. 2 and FIG. 3 are diagrams illustrates the structure of the system for measuring interferences.

The present disclosure can be described by the embodiments given below. It is understood, however, that the embodiments below are not necessarily limitations to the present disclosure, but are used to a typical implementation of the invention.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary the intent is to cover all alternatives, modifications and equivalents included within the spirit and scope of the invention as defined by the appended claims.

It is noted that the drawings presents herein have been provided to illustrate certain features and aspects of embodiments of the invention. It will be appreciated from the description provided herein that a variety of alternative embodiments and implementations may be realized, consistent with the scope and spirit of the present invention.

It is also noted that the drawings presents herein are not consistent with the same scale. Some scales of some components are not proportional to the scales of other components in order to provide comprehensive descriptions and emphasizes to this present invention.

Please refer to FIG. 1, which is a diagram shows a system for measuring interferences in accordance with an embodiment of the present invention. The system comprises a first source 10, a first detect device 20, an optical delay line device 30 and an optical path module for setting a plurality of paths, in which beams pass through, wherein the optical path module could be at least one of the group consisting of a lens array 40 and at least one optical fiber, or any combination thereof. The paths could be set by at least one beam-splitting device of the optical path module, such as the paths are set by at least one beam splitter or at least one polarizer, or the paths are set by at least one optical coupler in an optical fiber. Hence, the beam-splitting device could be a beam splitter, a polarizer, an optical coupler or any device which could split beams.

The paths comprise a first path from the first source 10 to a sample 90, a second path from the sample 90 to the first detect device 20, a third path from the first source 10 to the optical delay line device 30 and a fourth path from the optical delay line device 30 to the first detect device 20, as shown in FIG. 1.

Furthermore, the optical delay line device 30 delays beams by an optical phase modulation, and the optical delay line device 30 could be any device which could delay beams by the optical phase modulation resulted from physical characteristics comprising at least one of the group consisting of oscillation, displacement, rotation, expansion, contraction and variation of refractive index, or any combination thereof. For example, the optical delay line device 30 could be an Acousto-Optic Modulator, an Electro-Optic Modulation, a piezoelectric transducer, a linear displacement stage, a Voice Coil Motor, and so on.

The length of the fourth path is changed by the optical phase modulation so as to shift the phase of a first interference signal between the beam passing through the second path and the beam passing through the fourth path, and the first detect device 20 receives and detects the phase shift of the first interference signal. Then, the physical properties of the sample 90 could be obtained from measuring the phase shift of the first interference signal due to the beams reflected from different positions of the sample 90, wherein the physical properties comprise the information of the surface profile, the refractive index, the geometrical thickness, etc.

Because the optical delay line device 30 moves continuously when working, initial positions of the optical delay line device 30 for measuring different positions of the sample 90 would be different, and therefore, an extra phase shift in the first interference signal would be caused from the displacement (or instability) of the initial position of the optical delay line device 30. Hence, the phase shift of the first interference signal is generated from the measurement of the sample 90 and the extra phase shift due to the displacement (or instability) of the initial position of the optical delay line device 30.

Figure 2:
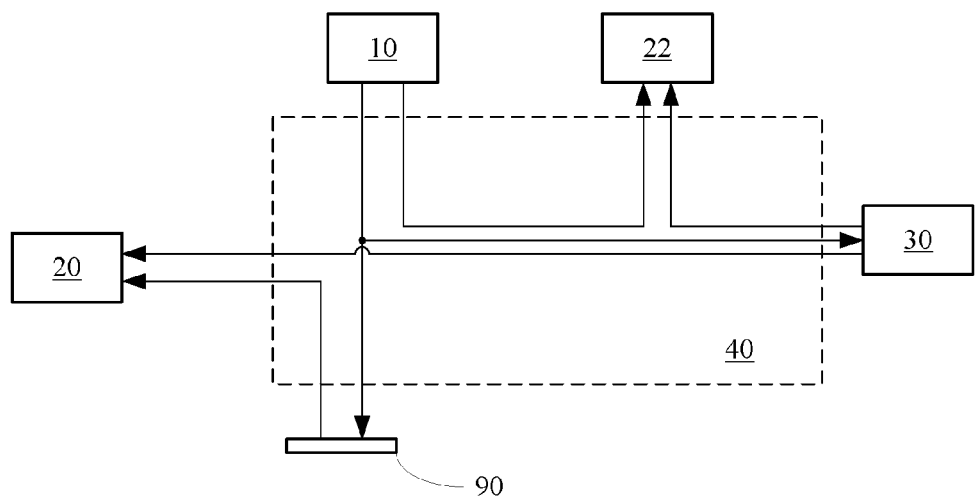

According to the foregoing description, the system further comprises a second detect device 22, as shown in FIG. 2, wherein the paths further comprise a fifth path from the optical delay line device 30 to the second detect device 22 and a sixth path from the first source 10 to the second detect device 22.

The length of the fifth path is changed by the optical phase modulation so as to shift the phase of a second interference signal between the beam passing through the fifth path and the beam passing through the sixth path, and the second detect device 22 receives and detects the phase shift of the second interference signal, wherein the phase shift of the first interference signal coincides with the phase shift of the second interference signal, and an extra phase shift in the second interference signal and the extra phase shift in the first interference signal would be caused by the same displacement (or instability) of the initial position of the optical delay line device 30 for measuring different positions on the surface profile of the sample 90. Therefore, the extra phase shift in the first interference signal would be simultaneously compensated by the extra phase shift in the second interference signal so as to correct the phase deviation of the first interference signal for improving the accuracy for measuring the physical properties of the sample 90.

The lens array comprises at least one of the group consisting of Twyman Green interferometer, Fabry-Perot interferometer, Mach-Zehnder interferometer, Michelson interferometer, Fizeau interferometer, Mirau interferometer, Linnik interferometer, Newton interferometer, shearing interferometer and Display Hologram, or any combination thereof.

The phase of the first interference signal would be shifted because of the difference of the optical paths reflected from the undulation of the rough surface profile of the sample 90, and the undulant degree of the surface profile of the sample 90 could be obtained by measuring phase shifts resulted from detecting different positions on the surface profile of the sample 90.

Figure 3:
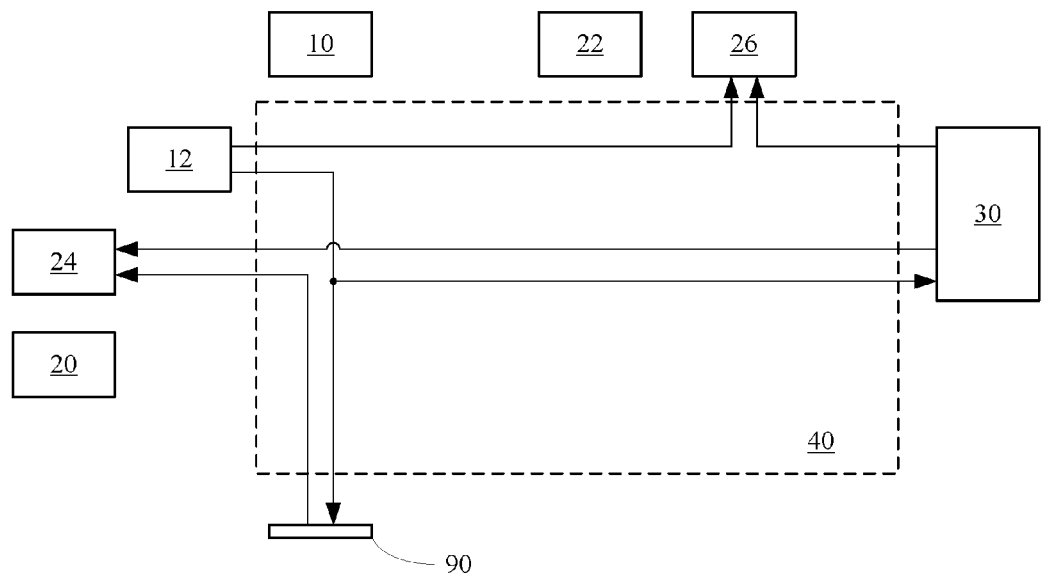

However, the undulant degree of the rough surface profile of the sample 90 might be error when the undulation between the adjacent two positions of the surface profile of the sample 90 is bigger than half wavelength of the beams from the first source 10. For improving the measurement range of the undulant degree of the surface profile of the sample 90, the system further comprises a second source 12, a third detect device 24 and a fourth detect device 26, wherein the paths further comprise a seventh path from the second source 12 to the sample 90, an eighth path from the sample 90 to the third detect device 24, a ninth path from the second source 12 to the optical delay line device 30, a tenth path from the optical delay line device 30 to the third detect device 24, an eleventh path from the optical delay line device 30 to the fourth detect device 26 and a twelfth path from the second source 12 to the fourth detect device 26, as shown in FIG. 3.

The length of the tenth path is changed by the optical phase modulation so as to shift the phase of a third interference signal between the beam passing through the eighth path and the beam passing through the tenth path, and the third detect device 24 receives and detects the phase shift of the third interference signal. Then, the physical properties of the sample 90 could be obtained from measuring the phase shift of the third interference signal due to the beams reflected from different positions of the sample 90.

The length of the eleventh path is changed by the optical phase modulation so as to shift the phase of a fourth interference signal between the beam passing through the eleventh path and the beam passing through the twelfth path, and the fourth detect device receives and detects the phase shift of the fourth interference signal, wherein the phase shift of the third interference signal coincides with the phase shift of the fourth interference signal, and an extra phase shift in the fourth interference signal and the extra phase shift in the third interference signal would be caused by the same displacement (or instability) of the initial position of the optical delay line device 30 for measuring different positions on the surface profile of the sample 90. Therefore, the extra phase shift in the third interference signal would be simultaneously compensated by the extra phase shift in the fourth interference signal so as to correct the phase deviation of the third interference signal for improving the accuracy for measuring the physical properties of the sample 90.

In addition, frequencies (or wavelengths) of beams from the first source 10 and the second source 12 must be different for improving the measurement range of the undulant degree of the surface profile of the sample 90.

Figure 4:
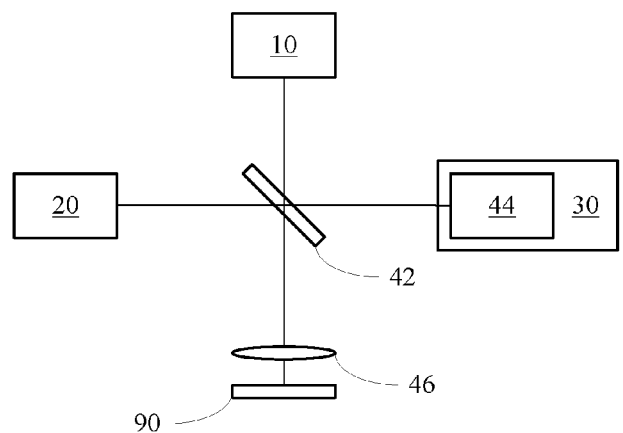
FIG. 4, FIG. 5, FIG. 6A, FIG. 6B, FIG. 7 and FIG. 8 are diagrams depicts the structure of the system for measuring the information of the surface profile of a sample.

For distinctly expounding how to measure the surface profile of the sample 90, another embodiment of the present invention discloses that the system for measuring interferences is based on the above-mentioned Michelson interferometer, as shown in FIG. 4. A first laser with the wavelength, $\lambda_1$, is generated from the first source 10, and the lens array 40 comprises a first beam splitter 42, a first reflective mirror 44 and a lens 46, wherein first reflective mirror 44 is configured on the optical delay line device 30.

The first laser passes through the first path, wherein the first laser is projected from the first source 10, transmitted via the first beam splitter 42, and focused on the sample 90 by the lens 46, in turn.

The first laser passes through the second path, wherein the first laser is reflected from the sample 90, transmitted via the lens 46, and reflected to the first detect device 20 by the first beam splitter 42, in turn.

The first laser passes through the third path, wherein the first laser is projected from the first source 10 and reflected to the first reflective mirror 44 by the first beam splitter 42, in turn.

The first laser passes through the fourth path, wherein the first laser is reflected by the first reflective mirror 44 and transmitted to the first detect device 20 via the first beam splitter 42, in turn.

The length of the fourth path is changed by the optical phase modulation so as to shift the phase of a first interference signal between the first laser passing through the second path and the first laser passing through the fourth path, and the first detect device 20 receives and detects the phase shift of the first interference signal. Then, the information of the surface profile of the sample 90 could be obtained from measuring the phase shift of the first interference signal due to the first laser reflected from different positions on the surface profile of the sample 90

Figure 5:
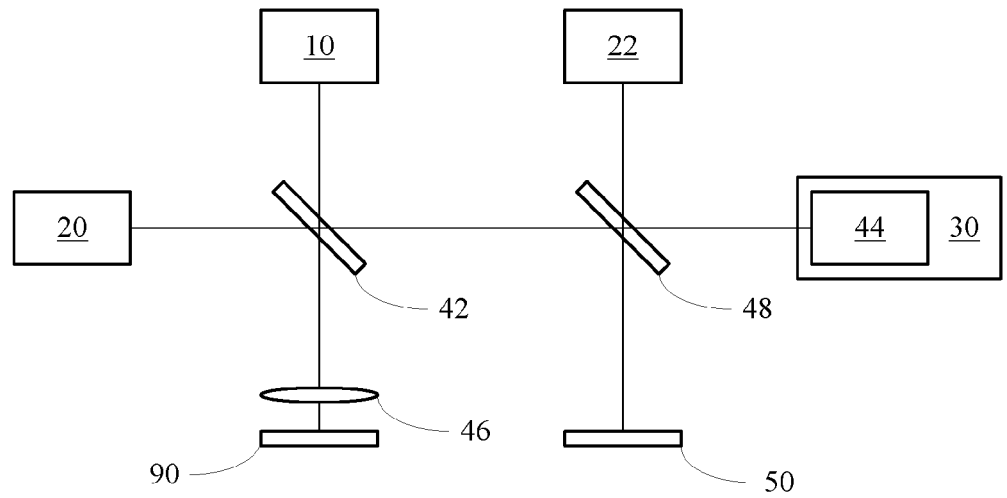

For measuring the extra phase shifts due to the displacement (or instability) of the initial position of the optical delay line device 30 for measuring different positions on the surface profile of the sample 90, the lens array 40 further comprises a second beam splitter 48 and a second reflective mirror 50, wherein the system for measuring interferences is a compound system for measuring interferences based on two Michelson interferometers, as shown in FIG. 5.

The first laser passes through the third path, wherein the first laser is projected from the first source 10 and transmitted to the first reflective mirror 44 by the second beam splitter 48, in turn.

The first laser passes through the fourth path, wherein the first laser is reflected by the first reflective mirror 44 and transmitted to the first detect device 20 via the second beam splitter 48 and the first beam splitter 42, in turn.

The first laser passes through the fifth path, wherein the first laser is reflected to the second detect device 22 by the first reflective mirror 44 and the second beam splitter 48, in turn.

The first laser passes through the sixth path, wherein the first laser is projected from the first source 10, reflected by the first beam splitter 42, the second beam splitter 48 and second reflective mirror 50 and transmitted to the second detect device 22 via the second beam splitter 48, in turn.

The length of the fifth path is changed by the optical phase modulation so as to shift the phase of a second interference signal between the first laser passing through the fifth path and the first laser passing through the sixth path, and the second detect device 22 receives and detects the phase shift of the second interference signal, wherein the phase shift of the first interference signal coincides with the phase shift of the second interference signal, and an extra phase shift in the second interference signal and the extra phase shift in the first interference signal would be caused by the same displacement (or instability) of the initial position of the optical delay line device 30 for measuring different positions on the surface profile of the sample 90. Therefore, the extra phase shift in the first interference signal would be simultaneously compensated by the extra phase shift in the second interference signal so as to correct the phase deviation of the first interference signal for improving the measurement dpi of the surface profile of the sample 90.

Figure 6A:
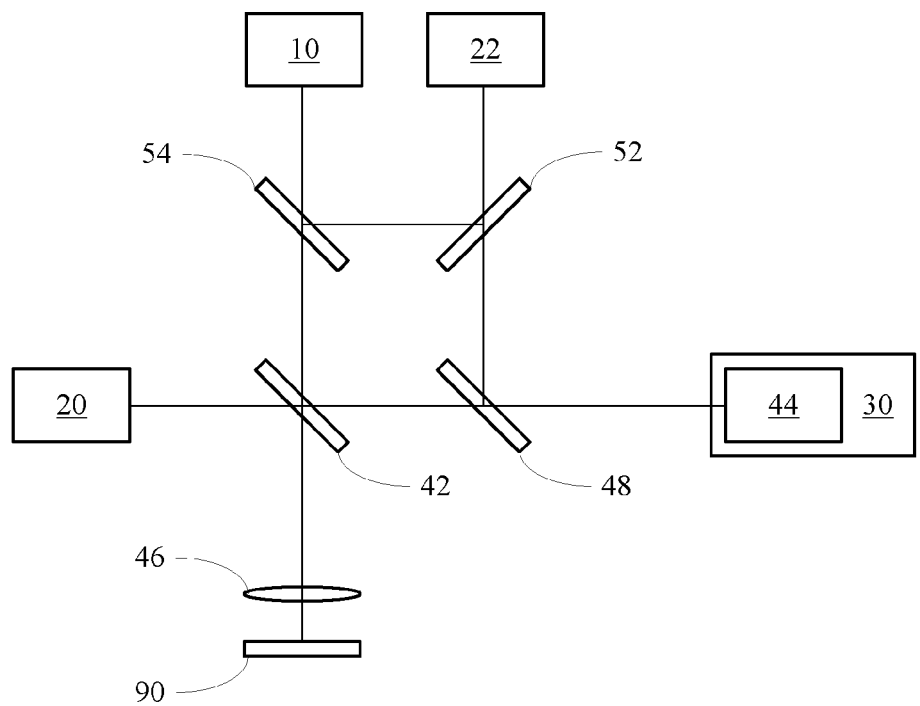

Please refer to FIG. 6A, a still another embodiment of the present invention discloses that the system for measuring interferences is compound system for measuring interferences based on a Michelson interferometer and a Mach-Zehnder interferometer.

The first laser is projected from the first source 10, transmitted via the first beam splitter 42, and focused on the sample 90 by the lens 46, in turn.

The first laser passes through the second path, wherein the first laser is reflected from the sample 90, transmitted via the lens 46, and reflected to the first detect device 20 by the first beam splitter 42, in turn.

The first laser passes through the third path, wherein the first laser is projected from the first source 10, reflected by the first beam splitter 42, and transmitted to the first reflective mirror 44 via the second beam splitter 48, in turn.

The first laser passes through the fourth path, wherein the first laser is reflected by the first reflective mirror 44, transmitted to the first detect device 20 via the second beam splitter 48 and the first beam splitter 42, in turn.

The first laser passes through the fifth path, wherein the first laser is reflected by the first reflective mirror 44 and the second beam splitter 48, transmitted to the second detect device 22 via a third beam splitter 52, in turn.

The first laser passes through the sixth path, wherein the first laser is projected from the first source 10, reflected to the second detect device 22 by a fourth beam splitter 54 and the third beam splitter 52, in turn.

The length of the fifth path is changed by the optical phase modulation so as to shift the phase of the second interference signal between the first laser passing through the fifth path and the first laser passing through the sixth path, and the second detect device 22 receives and detects the phase shift of the second interference signal, wherein the phase shift of the first interference signal coincides with the phase shift of the second interference signal, and an extra phase shift in the second interference signal and the extra phase shift in the first interference signal would be caused by the same displacement (or instability) of the initial position of the optical delay line device 30 for measuring different positions on the surface profile of the sample 90. Therefore, the extra phase shift in the first interference signal would be simultaneously compensated by the extra phase shift in the second interference signal so as to correct the phase deviation of the first interference signal for improving the measurement dpi of the surface profile of the sample 90.

Figure 6B:
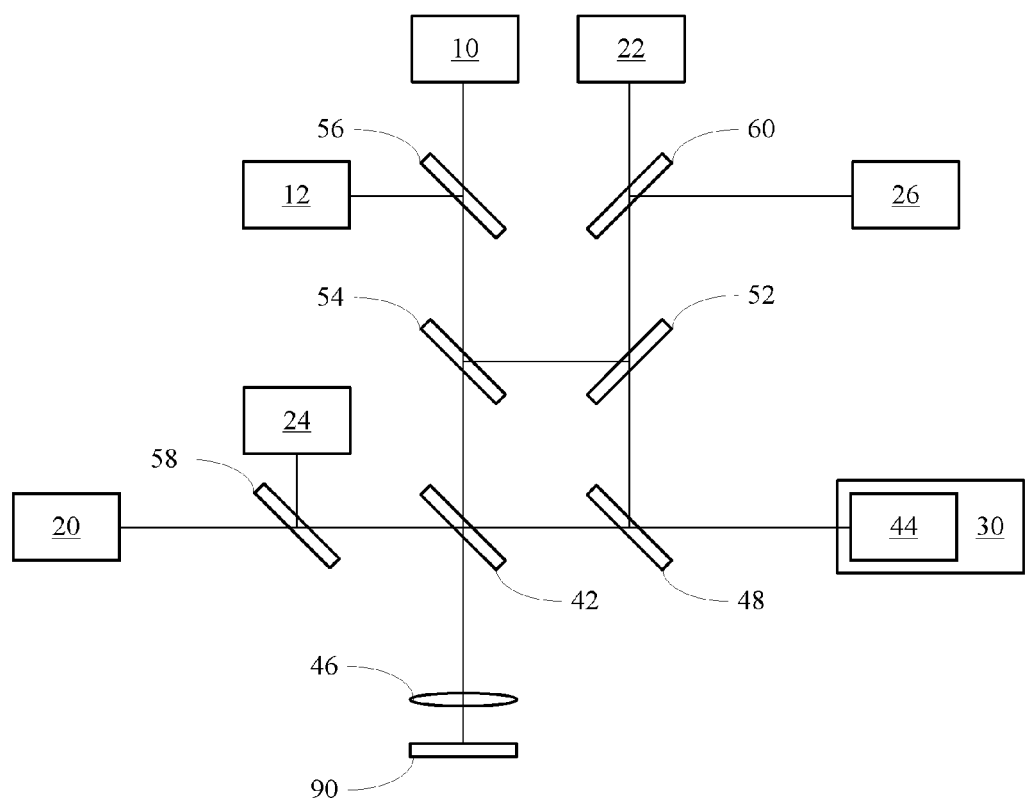

For improving the measurement range of the undulant degree of the surface profile of the sample 90, a second laser with the wavelength, $\lambda_2$, is projected from the second source 12, and the lens array 40 further comprises a first dichroic beam splitter 56, a second dichroic beam splitter 58 and a third dichroic beam splitter 60, as shown in FIG. 6B.

The first laser passes through the first path, wherein the first laser is projected from the first source 10, transmitted via the first dichroic beam splitter 56, the fourth beam splitter 54 and the first beam splitter 42, and focused on the sample 90 by the lens 46, in turn.

The first laser passes through the second path, wherein the first laser is reflected by the sample 90, transmitted via the lens 46, reflected by the first beam splitter 42, and transmitted to the first detect device 20 via the second dichroic beam splitter 58, in turn.

The first laser passes through the third path, wherein the first laser is projected from the first source 10, transmitted via the first dichroic beam splitter 56 and the fourth beam splitter 54, reflected by the first beam splitter 42, and transmitted to the first reflective mirror 44 via the second beam splitter 48, in turn.

The first laser passes through the fourth path, wherein the first laser is reflected by the first reflective mirror 44, transmitted to the first detect device 20 via the second beam splitter 48, the first beam splitter 42 and the second dichroic beam splitter 58, in turn.

The first laser passes through the fifth path, wherein the first laser is reflected by the first reflective mirror 44 and the second beam splitter 48, and transmitted to the second detect device 22 via the third beam splitter 52 and the third dichroic beam splitter 60, in turn.

The first laser passes through the sixth path, wherein the first laser is projected from the first source 10, transmitted via the first dichroic beam splitter 56, reflected by the fourth beam splitter 54 and the third beam splitter 52, and transmitted to the second detect device 22 via the third dichroic beam splitter 60, in turn.

The second laser passes through the seventh path, wherein the second laser is projected from the second source 12, transmitted via the fourth beam splitter 54 and the first beam splitter 42, and focused on the sample 90 by the lens 46, in turn.

The second laser passes through the eighth path, wherein the second laser is reflected by the sample 90, transmitted via the lens 46, reflected to the third detect device 24 by the first beam splitter 42 and the second dichroic beam splitter 58, in turn.

The second laser passes through the ninth path, wherein the second laser is projected from the second source 12, reflected by the first dichroic beam splitter 56, transmitted via the fourth beam splitter 54, reflected by the first beam splitter 42, and transmitted to the first reflective mirror 44 via the second beam splitter 48, in turn.

The second laser passes through the tenth path, wherein the second laser is reflected by the first reflective mirror 44, transmitted via the second beam splitter 48 and the first beam splitter 42, reflected to the third detect device 24 by the second dichroic beam splitter 58, in turn.

The second laser passes through the eleventh path, wherein the second laser is reflected by the first reflective mirror 44 and the second beam splitter 48, transmitted via the third beam splitter 52, and reflected to the fourth detect device 26 by the third dichroic beam splitter 60, in turn.

The second laser passes through the twelfth path, wherein the second laser is projected from the second source 12, and reflected to the fourth detect device 26 by the first dichroic beam splitter 56, the fourth beam splitter 54, the third beam splitter 52 and the third dichroic beam splitter 60, in turn.

The length of the fourth path is changed by the optical phase modulation so as to shift the phase of the first interference signal between the first laser passing through the second path and the first laser passing through the fourth path, and the first detect device 20 receives and detects the phase shift of the first interference signal. The length of the tenth path is changed by the optical phase modulation so as to shift the phase of the third interference signal between the second laser passing through the eighth path and the first laser passing through the tenth path, and the third detect device 24 receives and detects the phase shift of the third interference signal. Then, the information of the surface profile of the sample 90 could be obtained from measuring the phase shift of the interference signals due to the lasers reflected from different positions of the sample 90.

The length of the fifth path is changed by the optical phase modulation so as to shift the phase of the second interference signal between the first laser passing through the fifth path and the first laser passing through the sixth path, and the second detect device 22 receives and detects the phase shift of the second interference signal, wherein the phase shift of the first interference signal coincides with the phase shift of the second interference signal, and an extra phase shift in the second interference signal and the extra phase shift in the first interference signal would be caused by the same displacement (or instability) of the initial position of the optical delay line device 30 for measuring different positions on the surface profile of the sample 90. Therefore, the extra phase shift in the first interference signal would be simultaneously compensated by the extra phase shift in the second interference signal so as to correct the phase deviation of the first interference signal for improving the measurement dpi of the surface profile of the sample 90.

Similarly, the length of the eleventh path is changed by the optical phase modulation so as to shift the phase of the fourth interference signal between the second laser passing through the eleventh path and the second laser passing through the twelfth path, and the fourth detect device 26 receives and detects the phase shift of the fourth interference signal, wherein the phase shift of the third interference signal coincides with the phase shift of the fourth interference signal, and an extra phase shift in the fourth interference signal and the extra phase shift in the third interference signal would be caused by the same displacement (or instability) of the initial position of the optical delay line device 30 for measuring different positions on the surface profile of the sample 90. Therefore, the extra phase shift in the third interference signal would be simultaneously compensated by the extra phase shift in the forth interference signal so as to correct the phase deviation of the third interference signal for improving the measurement dpi of the surface profile of the sample 90.

Please refer to FIG. 6A for more explicitly illustrating the system for measuring interferences, as the above-mentioned, the first detect device 20 receives and detects the phase shift of the first interference signal between the first laser passing through the second path and the first laser passing through the fourth path, wherein the first laser passing through the second path is reflected from different positions on the surface profile of the sample 90 for measuring the information of the surface profile of the sample 90. However, the phase shift of the first interference signal is caused by the undulation of the surface profile of the sample 90 and the extra phase shift resulted from the displacement (or instability) of the initial position of the optical delay line device 30 for measuring different positions of the surface profile of the sample 90, wherein the extra phase shift is measured by the second detect device 22.

For these reasons, the phase shift only resulted from the undulation of the surface profile of the sample 90, can be obtained by deducting the extra phase shift of the second interference signal from the phase shift of the first interference signal, wherein the first interference signal and the second interference signal must be received by the detect devices simultaneously, and the undulant degree of the surface profile of the sample 90 and the product of the phase shift and the wavelength of the first laser are direct proportion.

According to another embodiment of the present invention, the system could directly measure the phase difference between the first interference signal and the second interference signal when detecting different positions of the sample 90, wherein the position of the surface profile of the sample 90 and the product of the phase shift and the wavelength of the first laser are direct proportion, and the phase difference can be measured by a program, a lock-in amplifier, other equivalent device and so on.

The undulant degree of the surface profile of the sample 90 might be error when the undulation between the adjacent two positions of the surface profile of the sample 90 is bigger than half wavelength of the beams from the first source 10. In other words, the interference shifts would be the same when the undulant degree between the adjacent two positions of the surface profile of the sample 90 is a specific value or the specific value with multiple of half wavelength. For improving the measurement range of the undulant degree of the surface profile of the sample 90, as shown in FIG. 6B, the system further comprises the second source 12, the third detect device 24 and the fourth detect device 26, wherein the wavelengths of the beams from the first source 10 and the second source 12 are different, and the fourth detect device 26 can be canceled in terms of actuality. Because the actual undulant degree of the surface profile of the sample 90 is a measurement value with multiple of half wavelength of beams from the first source 10, and is also the measurement value with multiple of half wavelength of beams from the second source 12, the actual undulant degree of the surface profile of the sample 90 is the common solution according to the both conditions.

Figure 7:
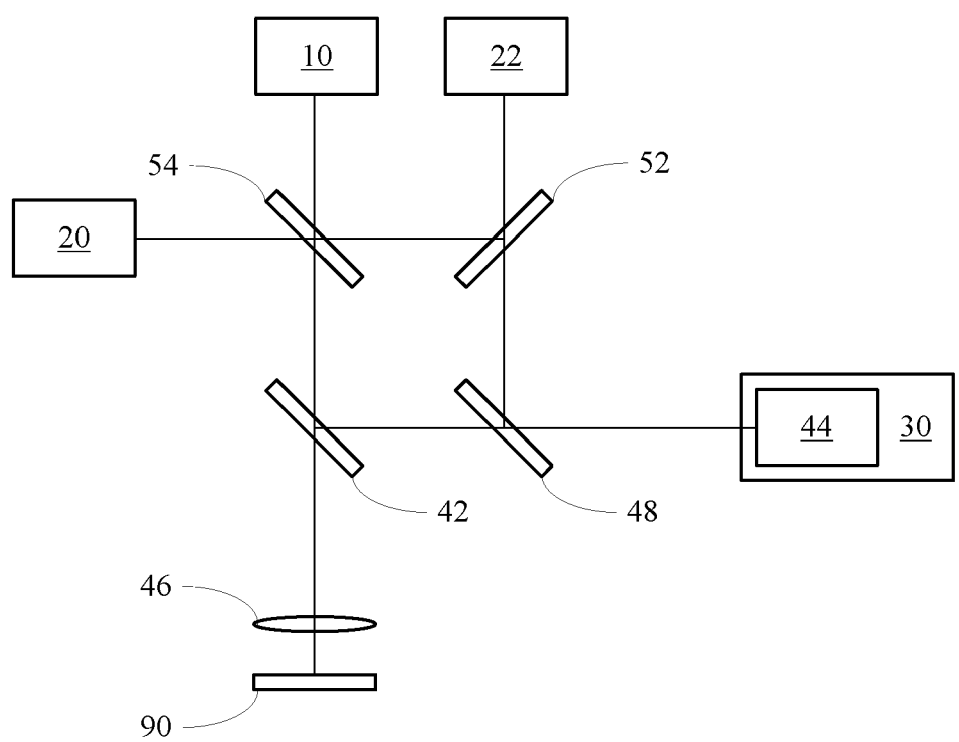
Figure 8:
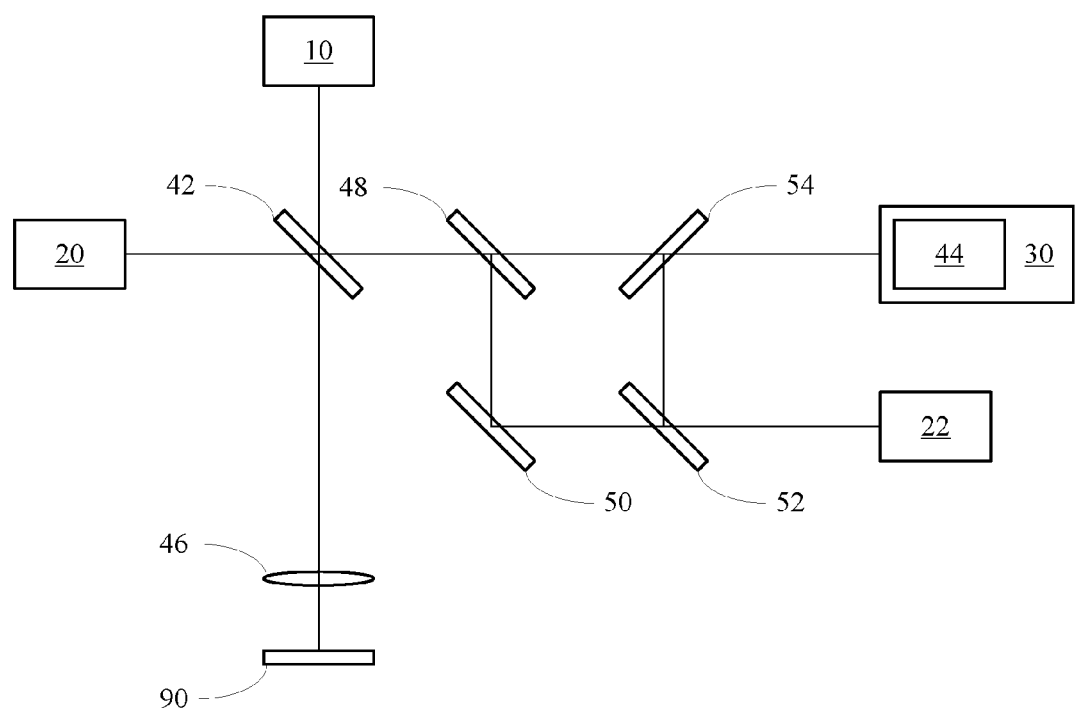

The followings explain that many kinds of disposition of the system for measuring interferences can be achieved, as shown in FIG. 7 and FIG. 8.

According to another one embodiment of the present invention, as shown in FIG. 7, the first laser passes through the first path, wherein the first laser is projected from the first source 10, transmitted via the fourth beam splitter 54 and the first beam splitter 42, and focused on the sample 90 by the lens 46, in turn.

The first laser passes through the second path, wherein the first laser is reflected by the sample 90, transmitted via the lens 46 and the first beam splitter 42, and reflected to the first detect device 20 by the fourth beam splitter 54, in turn.

The first laser passes through the third path, wherein the first laser is projected from the first source 10, transmitted via the fourth beam splitter 54, reflected by the first beam splitter 42, and transmitted to the first reflective mirror 44 via the second beam splitter 48, in turn.

The first laser passes through the fourth path, wherein the first laser is reflected by the first reflective mirror 44, transmitted via the second beam splitter 48, and reflected to the first detect device 20 by the first beam splitter 42 and the fourth beam splitter 54, in turn.

The first laser passes through the fifth path, wherein the first laser is reflected by the first reflective mirror 44 and the second beam splitter 48, and transmitted to the second detect device 22 via the third beam splitter 52, in turn.

The first laser passes through the sixth path, wherein the first laser is projected from the first source 10, and reflected to the second detect device 22 by the fourth beam splitter 54 and the third beam splitter 52, in turn.

According to still another one embodiment of the present invention, as shown in FIG. 8, the first laser passes through the first path, wherein the first laser is projected from the first source 10, transmitted via the first beam splitter 42, and focused on the sample 90 by the lens 46, in turn.

The first laser passes through the second path, wherein the first laser is reflected by the sample 90, transmitted via the lens 46, and reflected to the first detect device 20 by the first beam splitter 42, in turn.

The first laser passes through the third path, wherein the first laser is projected from the first source 10, reflected by the first beam splitter 42, and transmitted to the first reflective mirror 44 via the second beam splitter 48 and the fourth beam splitter 54, in turn.

The first laser passes through the fourth path, wherein the first laser is reflected by the first reflective mirror 44, and transmitted to the first detect device 20 via the fourth beam splitter 54, the second beam splitter 48 and the first beam splitter 42, in turn.

The first laser passes through the fifth path, wherein the first laser is reflected to the second detect device 22 by the first reflective mirror 44, the fourth beam splitter 54 and the third beam splitter 52, in turn.

The first laser passes through the sixth path, wherein the first laser is projected from the first source 10, reflected by the first beam splitter 42, the second beam splitter 48 and the second reflective mirror 50, and transmitted to the second detect device 22 via the third beam splitter 52, in turn.

The length of the fourth path is changed by the optical phase modulation so as to shift the phase of the first detect device 20 of the both foregoing embodiments receives the first interference signal between the first laser passing through the second path and the first laser passing through the fourth path, and the first detect device 20 receives and detects the phase shift of the first interference signals resulted from different positions of the sample 90, as shown in FIG. 7 and FIG. 8.

The second detect device 22 receives the second interference signal between the first laser passing through the fifth path and the first laser passing through the sixth path, wherein the extra phase shift would be resulted because initial positions of the optical delay line device 30 for measuring different positions of the sample 90 would be different. Therefore, the second detect device 22 receives and detects the second interference signals with different phases resulted by the variation of the length of the fifth path so as to measure the extra phase shift for improving the measurement dpi of the surface profile of the sample 90.

Figure 9:
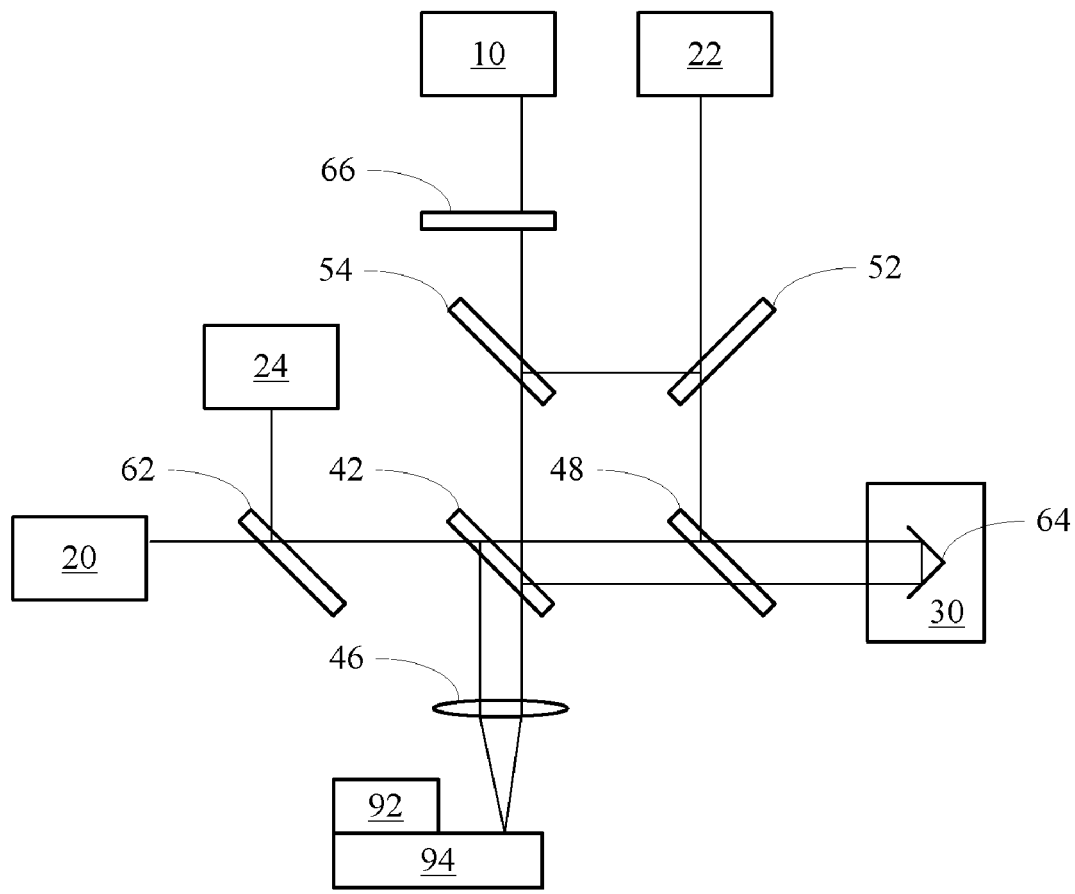
FIG. 9 is a diagram shows the structure of the system for measuring the refractive index and the thickness of a thin film.

For more explicitly describing the measurement of the refractive index and the thickness of the thin film 92, another one embodiment of the present invention discloses a system for measuring interferences based on the Mach-Zehnder interferometer and the Michelson interferometer, as shown in FIG. 9. The system comprises the first source 10, the first detect device 20, the second detect device 22, the third detect device 24, the optical delay line device 30, the first beam splitter 42, the lens 46, the second beam splitter 48, the third beam splitter 52, the fourth beam splitter 54, a polarizing beam splitter 62, a right-angled reflective mirror 64, a polarizer 66 and a stage 94, wherein the first laser is projected from the first source 10, the thin film 92 is placed on the stage 94, and the right-angled reflective mirror 64 is configured on the optical delay line device 30.

The first laser passes through the first path, wherein the first laser is projected from the first source 10, polarized by the polarizer 66, transmitted via the fourth beam splitter 54 and the first beam splitter 42, and inclined focused on the thin film 92 and the stage 94, wherein the first laser is refracted and multiply reflected in the thin film 92, in turn.

The laser passes through the second path, wherein the first laser is reflected by the thin film 92 and the stage 94, transmitted via the lens 46, reflected by the first beam splitter 42, and a first component of the polarized first laser is transmitted to the first detect device 20 via the polarizing beam splitter 62, in turn.

The first laser passes through the third path, wherein the laser is projected from the first source 10, polarized by the polarizer 66, transmitted via the fourth beam splitter 54, reflected by the first beam splitter 42, and transmitted to the right-angled reflective mirror 64 via the second beam splitter 48, in turn.

The laser passes through the fourth path, wherein the first laser is reflected by the right-angled reflective mirror 64, transmitted to the first detect device 20 via the second beam splitter 48, the first beam splitter 42 and the polarizing beam splitter 62, in turn.

The laser passes through the fifth path, wherein the first laser is reflected by the right-angled reflective mirror 64, reflected by the second beam splitter 48, and transmitted to the second detect device 22 via the third beam splitter 52, in turn.

The first laser passes through the sixth path, wherein the laser is projected from the first source 10, polarized by the polarizer 66, reflected to the second detect device 22 by the fourth beam splitter 54 and the third beam splitter 52, in turn.

The laser passes through the thirteenth path, wherein the first laser is reflected by the thin film 92 and the stage 94, reflected by the first beam splitter 42, and a second component of the polarized first laser is reflected to the third detect device 24 by the polarizing beam splitter 62, in turn.

The laser passes through the fourteenth path, wherein the first laser is transmitted via the second beam splitter 48 and the first beam splitter 42, and a second component of the polarized first laser is reflected to the third detect device 24 by the polarizing beam splitter 62, in turn.

The length of the fourth path is changed by the optical phase modulation so as to shift the phase of the first interference signal between the first component of the polarized first laser passing through the second path and first component of the polarized first laser passing through the fourth path, and the first detect device 20 receives and detects the phase shift of the first interference signals with different phases, wherein the phase shift is caused by the stage 94 and the thin film 92 placed on the stage 94.

The length of the fourteenth path is changed by the optical phase modulation so as to shift the phase of the fifth interference signal between the second component of the polarized first laser passing through the thirteenth path and the second component of the polarized first laser passing through the fourteenth path, and the third detect device 24 receives and detects the phase shift of the fifth interference signals with different phases, wherein the phase shift is caused by the stage 94 and the thin film 92 placed on the stage 94. Then, the refractive index and thickness of the thin film 92 could be obtained from measuring the phase shifts of the first interference and the fifth interference and comparing the intensity of the first interference and the fifth interference.

The second detect device 22 receives the second interference signal between the second component of the polarized first laser passing through the fifth path and the second component of the polarized first laser passing through the sixth path, wherein the extra phase shift would be resulted from only the stage 94, the thin film 92 placed on the stage 94 and different initial positions of the optical delay line device 30 for measuring different positions of the sample 90. Therefore, the second detect device 22 receives and detects the second interference signals with different phases resulted by the variation of the length of the fifth path so as to measure the extra phase shift for improving the measurement dpi of the thickness of the thin film 92.

The refractive index of the thin film 92 is measured by the first laser inclined projected to the thin film 92, wherein the first laser is polarized to TE wave and TM wave, and quantity of TE wave and TM wave is the same.

According to above-mentioned embodiments, the lens array 40 could be replaced by at least one optical fiber to set a plurality of the paths for reducing the disturbance of the optical signals and improving the quality of measurement, and the optical fiber also could substitute the reflective mirrors because the optical fiber could be curved. Components of the system could be trimmed and streamlined an organization on the strength of that optical couplers substitute the beam splitters.

According to the foregoing description, the present invention further discloses a method for measuring interferences, wherein the method comprises the following steps: generating a first beam by a first source; setting a first path by an optical path module, wherein the first beam is projected from the first source to a sample via the first path; setting a second path by the optical path module, wherein the first beam is reflected from the sample to a first detect device via the second path; setting a third path by the optical path module, wherein the first beam is projected from the first source to a optical delay line device via the third path; and setting a fourth path by the optical path module, wherein the first beam is reflected from the optical delay line device to the first detect device via the fourth path.

The length of the fourth path is changed by a optical phase modulation generated by the optical delay line device so as to shift the phase of a first interference signal between the first beam passing through the second path and the first beam passing through the fourth path, and the first detect device receives and detects the phase shift of the first interference signal.

Furthermore, the method further comprises the steps: setting a fifth path by the optical path module, wherein the first beam is reflected from the optical delay line device to a second detect device via the fifth path; and setting a sixth path by the optical path module, wherein the first beam is projected from the first source to the second detect device via the sixth path.

The length of the fifth path is changed by the optical phase modulation generated by the optical delay line device so as to shift the phase of a second interference signal between the first beam passing through the fifth path and the first beam passing through the sixth path, and the second detect device receives and detects the phase shift of the second interference signal.

The method further comprises the steps of: generating a second beam by a second source; setting a seventh path by the optical path module, wherein the second beam is projected from the second source to the sample via the seventh path; setting a eighth path by the optical path module, wherein the second beam is reflected from the sample to a third detect device via the eighth path; setting a ninth path by the optical path module, wherein the second beam is projected from the second source to the optical delay line device via the ninth path; and setting a tenth path by the optical path module, wherein the second beam is reflected from the optical delay line device to the third detect device via the tenth path.

The length of the tenth path is changed by the optical phase modulation generated by the optical delay line device so as to shift the phase of a third interference signal between the second beam passing through the eighth path and the second beam passing through the tenth path, and the third detect device receives and detects the phase shift of the third interference signal.

The method further comprises the steps of: setting an eleventh path by the optical path module, wherein the second beam is reflected from the optical delay line device to a fourth detect device via the eleventh path; and setting a twelfth path by the optical path module, wherein the second beam is projected from the second source to the fourth detect device via the twelfth path.

The length of the eleventh path is changed by the optical phase modulation generated by the optical delay line device so as to shift the phase of a fourth interference signal between the second beam passing through the eleventh path and the second beam passing through the twelfth path, and the fourth detect device receives and detects the phase shift of the fourth interference signal.

The method further comprises the steps of: setting a thirteenth path by the optical path module, wherein the first beam is reflected from the sample to the third detect device via the thirteenth path; and setting a fourteenth path by the optical path module, wherein the first beam is reflected from the optical delay line device to the third detect device via the fourteenth path.

The length of the fourteenth path is changed by the optical phase modulation generated by the optical delay line device so as to shift the phase of a fifth interference signal between the first beam passing through the thirteenth path and the first beam passing through the fourteenth path, and the third detect device receives and detects the phase shift of the fifth interference signal.

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the inventions as determined by the appended claims when interpreted in accordance with the breath to which they are fairly and legally entitled.

It is understood that several modifications, changes, and substitutions are intended in the foregoing disclosure and in some instances some features of the invention will be employed without a corresponding use of other features. Accordingly, it is appropriate that the appended claims be construed broadly and in a manner consistent with the scope of the invention.

The invention claimed is:

1. A system for measuring interferences, comprising:
    a first source, said first source being a first single-frequency light source;
    an optical delay line device, delaying beams by an optical phase modulation;
    a first detect device, said first detect device being a first interferometer;
    a second detect device, said second detect device being a second interferometer; and
    an optical path module, comprising a plurality of paths for beams to pass through, wherein said plurality of paths comprise:
        a first path, leading from said first source to a sample;
        a second path, leading from said sample to said first detect device;
        a third path, leading from said first source to said optical delay line device;
        a fourth path, leading from said optical delay line device to said first detect device;
        a fifth path, leading from said optical delay line device to said second detect device; and
        a sixth path, leading from said first source to said second detect device;
    wherein the length of said fourth path is changed by said optical phase modulation so as to shift the phase of a first interference signal between the beam passing through said second path and the beam passing through said fourth path, and said first detect device receives and detects the phase shift of said first interference signal;
    wherein the length of said fifth path is changed by said optical phase modulation so as to shift the phase of a second interference signal between the beam passing through said fifth path and the beam passing through said sixth path, and said second detect device receives and detects the phase shift of said second interference signal.

2. The system for measuring interferences of claim 1, further comprising a second source being a second single-frequency light source and a third detect device, wherein said plurality of paths further comprise:
    a seventh path, leading from said second source to said sample;
    an eighth path, leading from said sample to said third detect device;
    a ninth path, leading from said second source to said optical delay line device; and
    a tenth path, leading from said optical delay line device to said third detect device;
    wherein the length of said tenth path is changed by said optical phase modulation so as to shift the phase of a third interference signal between the beam passing through said eighth path and the beam passing through said tenth path, and said third detect device receives and detects the phase shift of said third interference signal.

3. The system for measuring interferences of claim 2, further comprising a fourth detect device, wherein said plurality of paths further comprise:
    an eleventh path, leading from said optical delay line device to said fourth detect device; and
    a twelfth path, leading from said second source to said fourth detect device;
    wherein the length of said eleventh path is changed by said optical phase modulation so as to shift the phase of a fourth interference signal between the beam passing through said eleventh path and the beam passing through said twelfth path, and said fourth detect device receives and detects the phase shift of said fourth interference signal.

4. The system for measuring interferences of claim 1, further comprising a third detect device, wherein said plurality of paths further comprise:
   a thirteenth path, leading form said sample to said third detect device; and
   a fourteenth path, leading from said optical delay line device to said third detect device;
   wherein the length of said fourteenth path is changed by said optical phase modulation so as to shift the phase of a fifth interference signal between the beam passing through said thirteenth path and the beam passing through said fourteenth path, and said third detect device receives and detects the phase shift of said fifth interference signal.

5. The system for measuring interferences of claim 1, wherein said optical path module comprises at least one or any combination of the following: a lens array and at least one optical fiber.

6. The system for measuring interferences of claim 5, wherein said lens array comprises at least one of the group consisting of at least one beam-splitting device, at least one reflective mirror, at least one lens, at least one polarizing device and at least one right-angled reflective mirror, or any combination thereof.

7. The system for measuring interferences of claim 6, wherein said at least one beam-splitting device comprises at least one or any combination of the following: at least one beam splitter and at least one polarizer.

8. The system for measuring interferences of claim 5, wherein said lens array comprises at least one of the group consisting of Twyman Green interferometer, Fabry-Perot interferometer, Mach-Zehnder interferometer, Michelson interferometer, Fizeau interferometer, Mirau interferometer, Linnik interferometer, Newton interferometer, shearing interferometer and Display Hologram, or any combination thereof.

9. The system for measuring interferences of claim 5, wherein said at least one optical fiber comprises at least one beam-splitting device.

10. The system for measuring interferences of claim 9, wherein said at least one beam-splitting device is at least one optical coupler.

11. The system for measuring interferences of claim 1, wherein said optical phase modulation is resulted from physical characteristics comprising at least one of the group consisting of oscillation, displacement, rotation, expansion, contraction and variation of refractive index, or any combination thereof.

12. The system for measuring interferences of claim 1, wherein said optical delay line device comprises at least one of the group consisting of Acousto-Optic Modulator, Electro-Optic Modulation, piezoelectric transducer, linear displacement stage and Voice Coil Motor, or any combination thereof.

13. The system for measuring interferences of claim 1, further comprising a sample stage, on which said sample is placed.

14. A method for measuring interferences, comprising the steps of:
   generating a first beam by a first source, wherein said first source is a first single-frequency light source;
   setting a first path by an optical path module, wherein said first beam is projected from said first source to a sample via said first path;
   setting a second path by said optical path module, wherein said first beam is reflected from said sample to a first detect device via said second path, wherein said first detect device is a first interferometer;
   setting a third path by said optical path module, wherein said first beam is projected from said first source to a optical delay line device via said third path;
   setting a fourth path by said optical path module, wherein said first beam is reflected from said optical delay line device to said first detect device via said fourth path, wherein the length of said fourth path is changed by a optical phase modulation generated by said optical delay line device so as to shift the phase of a first interference signal between said first beam passing through said second path and said first beam passing through said fourth path, and said first detect device receives and detects the phase shift of said first interference signal;
   setting a fifth path by said optical path module, wherein said first beam is reflected from said optical delay line device to a second detect device via said fifth path, wherein said second detect device is a second interferometer; and
   setting a sixth path by said optical path module, wherein said first beam is projected from said first source to said second detect device via said sixth path, wherein the length of said fifth path is changed by said optical phase modulation generated by said optical delay line device so as to shift the phase of a second interference signal between said first beam passing through said fifth path and said first beam passing through said sixth path, and said second detect device receives and detects the phase shift of said second interference signal.

15. The method for measuring interferences of claim 14, further comprising the steps of:
   generating a second beam by a second source, wherein said second source is a second single-frequency light source;
   setting a seventh path by said optical path module, wherein said second beam is projected from said second source to said sample via said seventh path;
   setting a eighth path by said optical path module, wherein said second beam is reflected from said sample to a third detect device via said eighth path;
   setting a ninth path by said optical path module, wherein said second beam is projected from said second source to said optical delay line device via said ninth path; and
   setting a tenth path by said optical path module, wherein said second beam is reflected from said optical delay line device to said third detect device via said tenth path, wherein the length of said tenth path is changed by said optical phase modulation generated by said optical delay line device so as to shift the phase of a third interference signal between said second beam passing through said eighth path and said second beam passing through said tenth path, and said third detect device receives and detects the phase shift of said third interference signal.

16. The method for measuring interferences of claim 15, further comprising the steps of:
   setting an eleventh path by said optical path module, wherein said second beam is reflected from said optical delay line device to a fourth detect device via said eleventh path; and
   setting a twelfth path by said optical path module, wherein said second beam is projected from said second source to said fourth detect device via said twelfth path, wherein the length of said eleventh path is changed by said optical phase modulation generated by said optical delay line device so as to shift the phase of a fourth interference signal between said second beam passing through said eleventh path and said second beam passing through said twelfth path, and said fourth detect device receives and detects the phase shift of said fourth interference signal.

17. The method for measuring interferences of claim 14, further comprising the steps of:
setting a thirteenth path by said optical path module, wherein said first beam is reflected from said sample to a third detect device via said thirteenth path; and
setting a fourteenth path by said optical path module, wherein said first beam is reflected from said optical delay line device to said third detect device via said fourteenth path, wherein the length of said fourteenth path is changed by said optical phase modulation generated by said optical delay line device so as to shift the phase of a fifth interference signal between said first beam passing through said thirteenth path and said first beam passing through said fourteenth path, and said third detect device receives and detects the phase shift of said fifth interference signal.

18. The method for measuring interferences of claim 14, wherein said optical path module comprises at least one or any combination of the following: a lens array and at least one optical fiber.

19. The method for measuring interferences of claim 18, wherein said lens array comprises at least one of the group consisting of at least one beam-splitting device, at least one reflective mirror, at least one lens, at least one polarizing device and at least one right-angled reflective mirror, or any combination thereof.

20. The method for measuring interferences of claim 19, wherein said at least one beam-splitting device comprises at least one or any combination of the following: at least one beam splitter and at least one polarizer.

21. The method for measuring interferences of claim 18, wherein said lens array comprises at least one of the group consisting of Twyman Green interferometer, Fabry-Perot interferometer, Mach-Zehnder interferometer, Michelson interferometer, Fizeau interferometer, Mirau interferometer, Linnik interferometer, Newton interferometer, shearing interferometer and Display Hologram, or any combination thereof.

22. The method for measuring interferences of claim 18, wherein said at least one optical fiber comprises at least one beam-splitting device.

23. The method for measuring interferences of claim 22, wherein said at least one beam-splitting device is at least one optical coupler.

24. The method for measuring interferences of claim 14, wherein said optical phase modulation is resulted from physical characteristics comprising at least one of the group consisting of oscillation, displacement, rotation, expansion, contraction and variation of refractive index, or any combination thereof.

25. The method for measuring interferences of claim 14, wherein said optical delay line device comprises at least one of the group consisting of Acousto-Optic Modulator, Electro-Optic Modulation, piezoelectric transducer, linear displacement stage and Voice Coil Motor, or any combination thereof.

26. The method for measuring interferences of claim 14, further comprising the steps of:
placing said sample on a sample stage.

* * * * *